United States Patent
Choi et al.

(10) Patent No.: US 11,828,880 B2
(45) Date of Patent: Nov. 28, 2023

(54) LIGHT TRANSMITTING AND RECEIVING DEVICE AND METHOD

(71) Applicant: KOREA ELECTRONICS TECHNOLOGY INSTITUTE, Seongnam-si (KR)

(72) Inventors: Hyun Yong Choi, Gwangju (KR); Choul Jun Choi, Gwangju (KR); Hyun Chang Cho, Gwangju (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 1095 days.

(21) Appl. No.: 16/344,926

(22) PCT Filed: Nov. 29, 2016

(86) PCT No.: PCT/KR2016/013874
§ 371 (c)(1),
(2) Date: Apr. 25, 2019

(87) PCT Pub. No.: WO2018/079921
PCT Pub. Date: May 3, 2018

(65) Prior Publication Data
US 2019/0265332 A1    Aug. 29, 2019

(30) Foreign Application Priority Data
Oct. 25, 2016    (KR) .......... 10-2016-0139172

(51) Int. Cl.
*G01S 7/484*     (2006.01)
*H05B 39/09*    (2006.01)
(Continued)

(52) U.S. Cl.
CPC ............ *G01S 7/484* (2013.01); *G01S 7/4868* (2013.01); *G01S 17/04* (2020.01); *G01S 17/42* (2013.01); *G01S 17/93* (2013.01); *H05B 39/09* (2013.01)

(58) Field of Classification Search
CPC .......... G01S 17/04; G01S 17/42; G01S 17/88; G01S 17/93; G01S 7/4808; G01S 7/484; G01S 7/4868; H05B 39/09
See application file for complete search history.

(56) References Cited

U.S. PATENT DOCUMENTS 5,831,717 A * 11/1998 Ikebuchi ............... G01S 7/4868
356/5.1
8,925,814 B1 * 1/2015 Schneider .......... G06K 7/10851
235/462.26
(Continued)

FOREIGN PATENT DOCUMENTS

DE    102010015941 A1    8/2011
JP       07-167958 A       7/1995
(Continued)

OTHER PUBLICATIONS

Extended European Search Report dated Sep. 18, 2019, in connection with corresponding European Patent Application No. 16919839.7.
(Continued)

*Primary Examiner* — Maria E Vazquez Colon
(74) *Attorney, Agent, or Firm* — Hauptman Ham, LLP (57) ABSTRACT

The present invention relates to a light transmitting and receiving device and method, which output the power of a partial optical pulse such that the power thereof is different from that of another optical pulse, so as to receive reflected light, and identify whether an object, which is undetectable using the reflected light of an optical pulse outputted with relatively low power, is detected using the reflected light of an optical pulse outputted with relatively high power, so as to adjust the power of an optical pulse to be output thereafter. Therefore, detection efficiency can be maximized using low power while eye safety requirements are satisfied.

10 Claims, 5 Drawing Sheets

(51) Int. Cl.
  *G01S 7/486*   (2020.01)
  *G01S 17/93*   (2020.01)
  *G01S 17/42*   (2006.01)
  *G01S 17/04*   (2020.01)

(56) References Cited

U.S. PATENT DOCUMENTS

2002/0071126 A1\* 6/2002 Shirai .................. G01S 17/931
                                                        356/614
2012/0106799 A1\* 5/2012 Shi ......................... G06T 7/174
                                                        382/103

FOREIGN PATENT DOCUMENTS

| | | |
|---|---|---|
| JP | 2006-021720 A | 1/2006 |
| JP | 2007-071595 A | 3/2007 |
| JP | 2015-152427 A | 8/2015 |
| KR | 10-2011-0025254 A | 3/2011 |
| WO | WO-2018044958 A1 \* | 3/2018 ............. G01S 17/04 |

OTHER PUBLICATIONS

International Search Report dated May 23, 2017 in connection with Korean Patent Application No. PCT/KR2016/013874.

\* cited by examiner

LIGHT TRANSMITTING AND RECEIVING DEVICE AND METHOD

CROSS-REFERENCE TO RELATED APPLICATION

The present application is a national stage filing under 35 U.S.C § 371 of PCT application number PCT/KR2016/013874 filed on Nov. 29, 2016 which is based upon and claims the benefit of priority to Korean Patent Application No. 10-2016-0139172, filed on Oct. 25, 2016, in the Korean Intellectual Property Office, which is incorporated herein in its entirety by reference.

TECHNICAL FIELD

The present invention relates to a technique for detecting an object by transmitting and receiving light and, more particularly, to a light transmitting and receiving device and method for outputting an optical pulse and detecting an object by using reflected light.

BACKGROUND ART

In connection with a technique for detecting an object, various devices such as a laser range finder (LRF), a light detection and ranging (LiDAR), and the like have been used.

For example, the LiDAR is a device that detects the shape and the like of a particular object by emitting a laser beam, receiving reflected light, and using the time, intensity, frequency change, or polarization state change of the reflected light. The LiDAR is also referred to as laser radar.

The LiDAR is mounted on a moving device such as a vehicle and detects surrounding objects. However, certain objects having low reflectivity such as a person dressed in black or an anti-reflection coated vehicle are difficult to detect through a typical detection process.

In such cases, it is possible to perform a more accurate detecting operation by raising the power of the LiDAR. However, in case of emitting high-power light, a human eye safety problem may be caused. Also, due to limitations in the power of a vehicle, it is difficult to continuously output high-power light.

Accordingly, the accurate detection may not be accomplished.

DISCLOSURE

Technical Problem

In order to solve the above-mentioned problem, the present invention provides a device and method for outputting optical pulses some of which have a certain power value different from that of the others. In addition, when there is a difference in detection data according to reflected light of the optical pulses outputted at different power values, the device and method adjust the power of optical pulses to be outputted thereafter to perform detection.

Technical Solution

A light transmitting and receiving device according to the present invention includes a light source configured to output optical pulses, a light receiver configured to receive reflected light corresponding to the optical pulses, a controller configured to control the light source to output the optical pulses some of which are different in a power value from others, and a detector configured to detect an object by using the reflected light received by the light receiver.

In the light transmitting and receiving device, the controller may be further configured to adjust power of optical pulses to be outputted by the light source, based on detection data of the detector.

In the light transmitting and receiving device, the controller may be further configured to, when there is a difference in the detection data according to the reflected light of the optical pulses outputted at different power values, adjust the power of the optical pulses to be outputted by the light source.

In the light transmitting and receiving device, the controller may be further configured to adjust the power of the optical pulses outputted at low power to be increased.

In the light transmitting and receiving device, the controller may be further configured to adjust the optical pulses outputted at high power and the optical pulses outputted at low power to be outputted at same power value.

In the light transmitting and receiving device, the controller may be further configured to adjust the power of the optical pulses to be outputted in a direction that causes the difference in the detection data.

In the light transmitting and receiving device, the controller may be further configured to adjust the power of the optical pulses either discontinuously based on a predetermined value or continuously to correspond to the detection data of the detector.

In the light transmitting and receiving device, the controller may be further configured to readjust the power of the optical pulses to be outputted thereafter by the light source in response to the detection data corresponding to the optical pulses outputted at the adjusted power.

In the light transmitting and receiving device, the controller may be further configured to, after an elapse of a predetermined time from adjusting the power of the optical pulse, readjust the power of the optical pulses to be outputted thereafter by the light source.

In the light transmitting and receiving device, the controller may be further configured to, after adjusting the power of the optical pulse, output a specific optical pulse at same power as the power of the optical pulse outputted at low power before adjustment, and when the detector recognizes that there is no difference between detection data according to the reflected light of the power-adjusted optical pulse and detection data according to the specific optical pulse, readjust the power of the optical pulses to be outputted thereafter by the light source to an original state before the adjustment.

A light transmitting and receiving method according to the present invention includes, at a light transmitting and receiving device, outputting optical pulses some of which are different in a power value from others, receiving reflected light corresponding to the outputted optical pulses, and detecting an object by using the reflected light.

The light transmitting and receiving method may further includes, at the light transmitting and receiving device, adjusting power of optical pulses to be outputted thereafter, based on detection data obtained when detecting the object.

In the light transmitting and receiving method, the adjusting may include, at the light transmitting and receiving device, when there is a difference in the detection data according to the reflected light of the optical pulses outputted at different power values, adjusting the power of the optical pulses to be outputted thereafter.

The light transmitting and receiving method may further includes, at the light transmitting and receiving device, in response to the detection data corresponding to the optical pulses outputted at the adjusted power, readjusting the power of the optical pulses to be outputted thereafter.

The light transmitting and receiving method may further includes, at the light transmitting and receiving device, after an elapse of a predetermined time from adjusting the power of the optical pulse, readjusting the power of the optical pulses to be outputted thereafter.

The light transmitting and receiving method may further includes, at the light transmitting and receiving device, after adjusting the power of the optical pulse, outputting a specific optical pulse at same power as the power of the optical pulse outputted at low power before adjustment, at the light transmitting and receiving device, recognizing that there is no difference between detection data according to the reflected light of the power-adjusted optical pulse and detection data according to the specific optical pulse, and at the light transmitting and receiving device, readjusting the power of the optical pulses to be outputted thereafter to an original state before the adjustment.

In addition, the present invention provides a non-transitory computer-readable recording medium that records a program for performing the light transmitting and receiving method.

Advantageous Effects

According to the light transmitting/receiving device and method of the present invention, the power of some optical pulses is outputted differently from the power of the other optical pulses. Then, if it is recognized through a detection result using the optical pulses of high power that there is an object undetectable using the optical pulses of low power, a more precise detecting operation can be performed by adjusting the power of the optical pulses.

At this time, instead of outputting all the optical pulses at high power, only some of the optical pulses are outputted at high power to perform the detecting operation. This can minimize the risk that a human eye is exposed to high-power light.

In addition, some of the optical pulses are outputted at lower power than that of optical pulses outputted at a conventional detecting device, and the others are outputted at higher power than that of optical pulses outputted at the conventional detecting device. It is therefore possible to perform a precise detecting operation while minimizing the total power consumption.

Further, when adjusting the power of the optical pulses, a power adjustment value may be set variously. That is, the power of the optical pulses can be adjusted to a value between low and high power values of previously outputted optical pulses, or to a value equal to or greater than the high power value of previously outputted optical pulses.

Also, when adjusting the power of the optical pulses, an adjustment process can be rapidly performed according to a predetermined value. Alternatively, the adjustment process can be performed in a manner of readjusting the power on the basis of a detection result while continuously changing power values. It is therefore possible to perform a precise detecting operation while minimizing the total power consumption.

As a result, it is possible to perform the detecting operation by adjusting the power of the optical pulses. This allows effectively detecting a detection-difficult object, satisfying a user's eye safety condition, and minimizing power consumption.

MODE FOR DISCLOSURE

In the following description, techniques that are well known in the art and not directly related to the present invention are not described. This is to clearly convey the subject matter of the present invention by omitting an unnecessary explanation.

The terms and words used in the following description and claims are not limited to the typical or bibliographical meanings thereof and are merely used by the inventor to enable a clear and consistent understanding of the invention.

Therefore, it will be apparent to those skilled in the art that the following description about various embodiments of the present invention is provided for illustration purpose only and not for the purpose of limiting the invention as defined by the appended claims and their equivalents.

The present invention relates to a light transmitting and receiving device.

Hereinafter, embodiments of the present invention will be described in detail with reference to the accompanying drawings.

Figure 1:
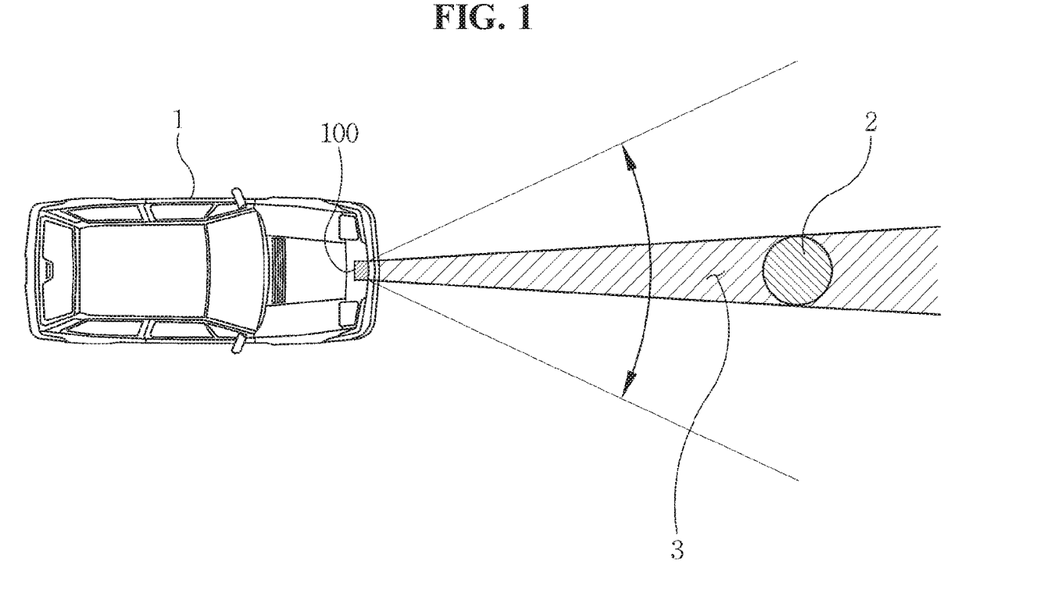
FIG. 1 is a diagram illustrating a detecting operation of a light transmitting and receiving device according to an embodiment of the present invention.

FIG. 1 is a diagram illustrating a detecting operation of a light transmitting and receiving device 100 according to an embodiment of the present invention.

Figure 2:
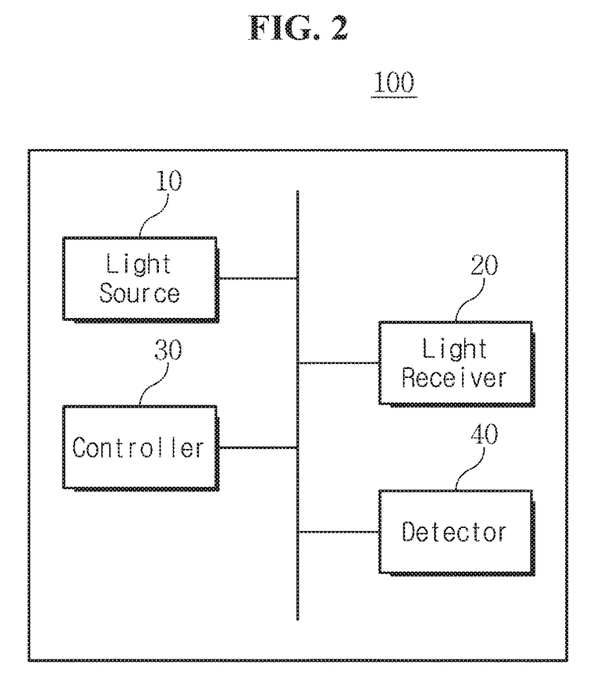
FIG. 2 is a diagram illustrating a configuration of a light transmitting and receiving device according to an embodiment of the present invention.

FIG. 2 is a diagram illustrating a configuration of a light transmitting and receiving device 100 according to an embodiment of the present invention.

Figure 3:
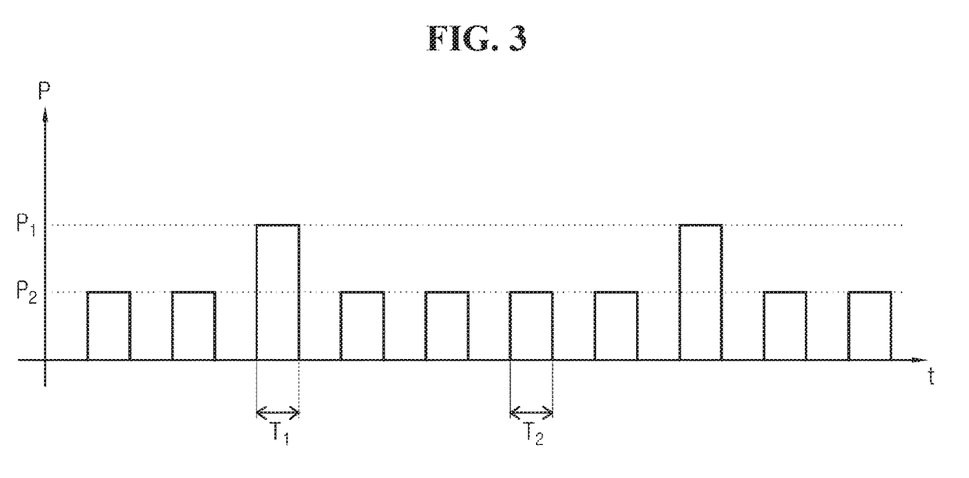
FIG. 3 is a diagram illustrating a frame of light output according to an embodiment of the present invention.
Figure 4:
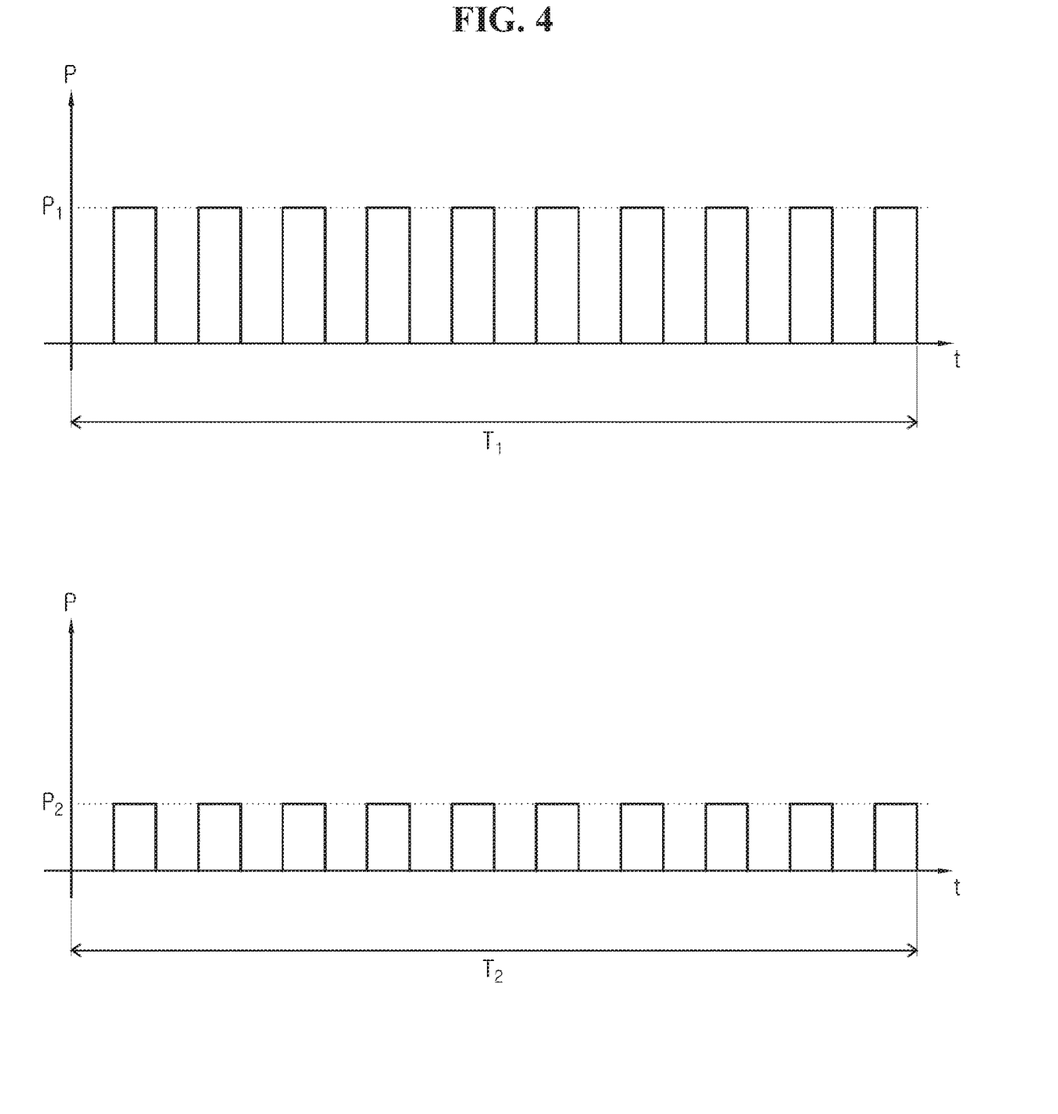
FIG. 4 is a diagram illustrating power of optical pulses contained in a frame according to an embodiment of the present invention.
Figure 5:
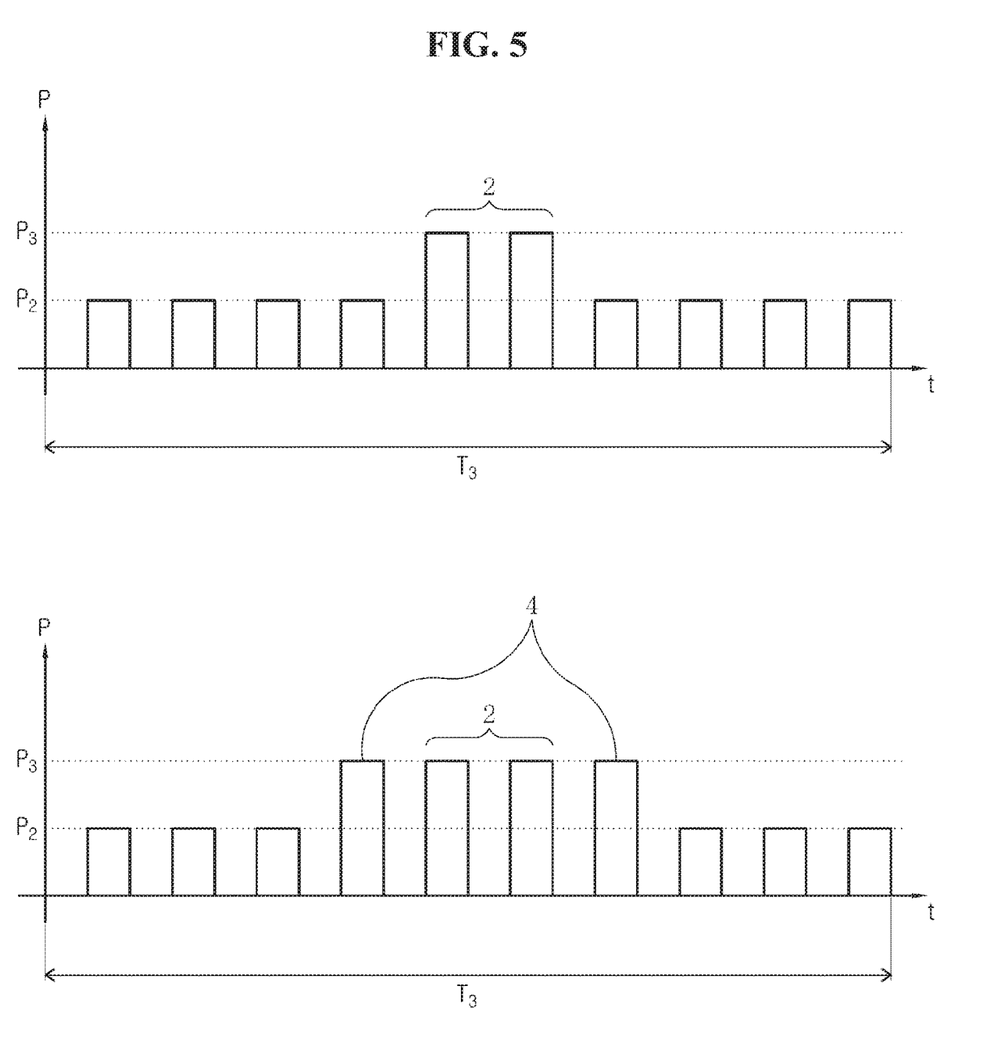
FIG. 5 is a diagram illustrating power of optical pulses contained in a frame according to another embodiment of the present invention.

FIG. 3 is a diagram illustrating a frame of light output according to an embodiment of the present invention. FIG. 4 is a diagram illustrating power of optical pulses contained in a frame according to an embodiment of the present invention. FIG. 5 is a diagram illustrating power of optical pulses contained in a frame according to another embodiment of the present invention.

Referring to FIGS. 1 to 5, the light transmitting/receiving device 100 of embodiments is mounted on various kinds of moving devices such as a vehicle 1 as shown in FIG. 1 and is capable of detecting a surrounding object 2. The device 100 may have a fixed position and perform a detecting operation.

The light transmitting/receiving device 100 periodically outputs an optical frame containing a plurality of optical pulses, receives reflected light, and detects an object. Specifically, the light transmitting/receiving device 100 outputs a light beam 3 in respective directions of a detection area while varying an output direction of the optical pulses by using a motor or a reflector, performs a detecting operation through the reflected light in each direction, and thereby identifies an object existing in a certain direction. When performing the detecting operation, the light transmitting/receiving device 100 may periodically output the optical frame so that a plurality of optical pulses contained in one frame cover the entire detection area or a plurality of optical pulses contained in a plurality of frames cover the entire detection area.

The light transmitting/receiving device 100 may be any apparatus that detects an object by using reflected light after emission of light. For example, the light transmitting/receiving device 100 may be a device, such as light detection and ranging (LiDAR), that detects a particular object by outputting a laser beam, receiving reflected light, and using the turnaround time, intensity, frequency change, or polarization state change of the reflected light.

As shown in FIG. 2, the light transmitting/receiving device 100 of embodiments includes a light source 10, a light receiver 20, a controller 30, and a detector 40.

The light source 10 is configured to periodically output an optical frame containing a plurality of optical pulses so as to detect an object in the vicinity.

The light source 10 may output a certain number of optical frames within a unit time, and the power of the optical pulses in each frame may be variably adjusted under the control of the controller 30.

The light receiver 20 is configured to receive the reflected light of the optical pulses outputted by the light source 10. For this, the light receiver 20 includes a light receiving element.

The controller 30 is configured to control the overall operation of the light transmitting/receiving device 100 that includes the light source 10, the light receiver 20, and the detector 40. For this, the controller 30 includes a processing unit, a memory, storage for an operating program, and the like.

The controller 30 controls the light source 10 to periodically output an optical frame containing a plurality of optical pulses. In particular, the controller 30 controls the light source 10 such that the power of some optical pulses outputted by the light source 10 is different from the power of the other optical pulses. For example, the controller 30 may control the light source 10 to output the optical pulses of some frames at power of 200 watt (W) and also output the optical pulses of the other frames at power of 30 W. In this case, the optical pulses outputted at low power (e.g., 30 W) is used for a normal detecting operation, and the optical pulses outputted at high power (e.g., 200 W) is used for detecting an object which is undetectable when using the optical pulses of low power (e.g., 30 W). For example, when the light output power of a typical detecting device using light is 75 W, the device of the invention outputs the optical pulses contained in most frames at low power (e.g., 30 W) and outputs only the optical pulses contained in some frames at high power (e.g., 200 W).

This makes it possible to prevent a human's eye from being damaged due to a continuous output of high-power light and also prevent an increase of total power consumption or reduce the power consumption. In embodiments, it is possible to output a plurality of optical pulses contained in a single frame at different power values. That is, among a plurality of optical pulses contained in a single frame, most of the optical pulses may be outputted at low power (e.g., 30 W), and only the others may be outputted at high power (e.g., 200 W).

The detector 40 is configured to detect an object in the vicinity of the light transmitting/receiving device 100 by using the reflected light received by the light receiver 20, and to deliver detection data to the controller 30. In particular, using the reflected light of the optical pulse outputted at high power, the detector 40 may detect an object which is undetectable when using the reflected light of the optical pulse outputted at low power.

The controller 30 adjusts the power of optical pulses to be outputted by the light source 10, based on the detection data of the detector 40. At this time, if there is a difference in the detection data according to the reflected lights of the optical pulses outputted at different power values, the controller 30 adjusts the power of optical pulses to be outputted by the light source 10 and attempts precise detection.

When a certain object found in the detection data according to the reflected light of the optical pulse outputted at high power is not found in the detection data according to the reflected light of the optical pulse outputted at low power, the controller 30 recognizes that there is an object which is undetectable when using the low-power optical pulse. Then, the controller 30 adjusts the power of optical pulses to be outputted by the light source 10 to perform precise detection. For example, the controller 30 raises the power of the low-power optical pulse such that an object which has been undetectable using the low-power optical pulse can be detected.

Referring to FIG. 3, the horizontal axis represents the output time (t) of each optical frame, and the vertical axis represents the power (P) of each optical frame.

As shown, the light source 10 periodically outputs ten optical frames under the control of the controller 30. In this case, two frames each having a time $T_1$ have power $P_1$ relatively higher than that of the other eight frames. Also, eight frames each having a time $T_2$ have relatively low power $P_2$.

In addition, referring to FIG. 4, an upper part of FIG. 4 shows the power $P_1$ of optical pulses contained in a frame of time $T_1$, and a lower part of FIG. 4 shows the power $P_2$ of optical pulses contained in a frame of time $T_2$.

In this case, an optical pulse contained in the frame of time $T_1$ and having low power $P_2$ is used for a normal detecting operation, and an optical pulse contained in the frame of time $T_2$ and having high power $P_1$ is used for determining whether there is an object which is undetectable when using low power $P_2$. At this time, the detector 40 detects an object by using the reflective light received by the light receiver 20.

When the detector 40 recognizes that there is a difference between the detection data according to the reflected light of the optical pulse outputted at high power $P_1$ and the detection data according to the reflected light of the optical pulse outputted at low power $P_2$, the controller 30 adjusts the power of optical pulses to be outputted by the light source 10 so as to perform a precise detecting operation.

For example, when the detector 40 detects an object, based on the reflected light received by the light receiver 20, the object may be detected in the detection data corresponding to the reflected light of the optical pulse outputted at high power $P_1$ even though being not detected in the detection data corresponding to the reflected light of the optical pulse outputted at low power $P_2$. In this case, the controller 30 may attempt the detection for the object through high-power light by controlling the light source 10 to raise the power of the low-power optical pulse. Specifically, the controller 30 may increase the power of the low-power optical pulse to a certain value being smaller than, equal to, or greater than the high power $P_1$. For example, assuming that an optical pulse of a specific frame is outputted at high power of 200 W and an optical pulse of another frame is outputted at low power of 30 W, the controller 30 may increase the power of the 30 W optical pulse to 75 W smaller than 200 W, to 200 W, or to 220 W greater than 200 W.

In addition, the controller 30 may adjust the high-power optical pulse and the low-power optical pulse to have the same power value. In this case, the adjusted power of all the optical pulses has a value greater than the low power $P_2$. For example, in a situation where an optical pulse of a specific frame is outputted at high power of 200 W and an optical pulse of another frame is outputted at low power of 30 W, when the controller 30 intends to increase the power of the 30 W optical pulse to 75 W, the controller 30 may also adjust the power of the 200 W optical pulse to 75 W so as for the total optical pulses to have the same power of 75 W.

Meanwhile, when adjusting the power of the optical pulse, the controller 30 may perform a stepwise adjustment so that the power is discontinuously increased according to a predetermined value. In this case, the controller 30 may previously store a power adjustment value in an internal memory and adjust the power of the optical pulse by referring to the stored power adjustment value. For example, when the optical pulse of a specific frame is outputted at power of 200 W and the optical pulse of another frame is outputted at power of 30 W, the detector 40 may recognize that there is a difference between the detection data according to the reflected light of the 30 W optical pulse and the detection data according to the reflected light of the 200 W optical pulse. Then, the controller 30 may perform a discontinuous adjustment by increasing the power of the optical pulse being outputted at power of 30 W to reach a predetermined adjustment value 75 W. If the detector 40 does not obtain an accurate detection result due to a lack of data as a result of checking the detection data based on the optical pulse outputted at the adjusted power of 75 W, the controller 30 may further adjust the power of the optical pulse from 75 W to 150 W according to the predetermined adjustment value.

Alternatively, the controller 30 may adjust linearly the power of the optical pulse to continuously increase the power. In this case, the controller 30 may perform a continuous adjustment process by adjusting the power of the optical pulse, checking the detection data according to the optical pulse outputted at the adjusted power through the detector 40, and adjusting again the power of the optical pulse.

When the controller 30 controls the light source 10 to periodically output each optical frame while changing the output direction of a plurality of optical pulses contained in the optical frame, the detector 40 may perform a detecting operation for the respective directions by using the reflected light received by the light receiver 20. At this time, if it is recognized in detection data of a specific direction that there is a difference between the detection data based on the optical pulse outputted at relatively high power $P_1$ and the detection data based on the optical pulse outputted at relatively low power $P_2$, the controller 30 may increase the power of the optical pulse to be outputted in the specific direction so that the detecting operation can be performed accurately in the specific direction. Referring to FIG. 5, an upper part of FIG. 5 shows an optical frame containing a plurality of optical pulses outputted in different directions within a period $T_3$, and the power of the optical pulse 2 outputted in a direction causing a difference in detection data is adjusted to $P_3$ to perform a precise detecting operation only in that direction. In this case, the adjusted power $P_3$ may be set to a value between high power $P_1$ before adjustment and low power $P_2$ before adjustment, and may be set to a value equal to or greater than the high power $P_1$ before adjustment. In addition, as shown in a lower part of FIG. 5, the precise detecting operation may be performed by not only adjusting the power of the optical pulse 2 outputted in a direction causing a difference in detection data but also adjusting, to $P_3$, the power of at least one adjacent optical pulse 4.

Through the above process, the controller 30 may adjust the power of the optical pulse and then check the detection data of the detector 40 according to the optical pulse outputted at the adjusted power. As a result, if a precise detection is not accomplished due to a lack of data, etc., the controller 30 may further adjust the power of the optical pulse to be outputted thereafter by the light source 10 so as to improve the detection accuracy.

Meanwhile, after performing the precise detecting operation through the power adjustment, the controller 30 returns the power of optical pulses to be outputted by the light source 10 to an original state before the adjustment, and controls the light source 10 to output the optical pulse at relatively high power $P_1$ and the optical pulse at relatively low power $P_2$ in a normal detection state.

In this case, after an elapse of a predetermined time from adjusting the power of the optical pulse outputted by the light source 10, the controller 30 may readjust the power of optical pulses, to be outputted thereafter by the light source 10, to original powers $P_1$ and $P_2$ which are before the adjustment.

In addition, while the detector 40 performs the detecting operation at the adjusted power of the optical pulse, the controller 30 may output a specific optical pulse by way of trial at the same power $P_2$ as that of the optical pulse outputted at low power before the adjustment so as to check whether the accurate detection is accomplished. Then, the controller 30 may readjust the power of optical pulses to be outputted thereafter by the light source 10 to original powers $P_1$ and $P_2$ which are before the adjustment. In this case, if the detector 40 recognizes that there is no difference between detection data according to the reflected light of the optical pulse outputted at adjusted power $P_3$ and detection data according to the specific optical pulse outputted at power $P_2$, this means that the accurate detection can be accomplished for all objects even by using optical pulses of low power $P_2$. Therefore, the controller 30 returns to a normal operating state by readjusting the power of optical pulses to be outputted thereafter by the light source 10 to original powers $P_1$ and $P_2$ which are before the adjustment.

Now, a light transmitting and receiving method according to the disclosure will be described in detail with reference to FIG. 6.

Figure 6:
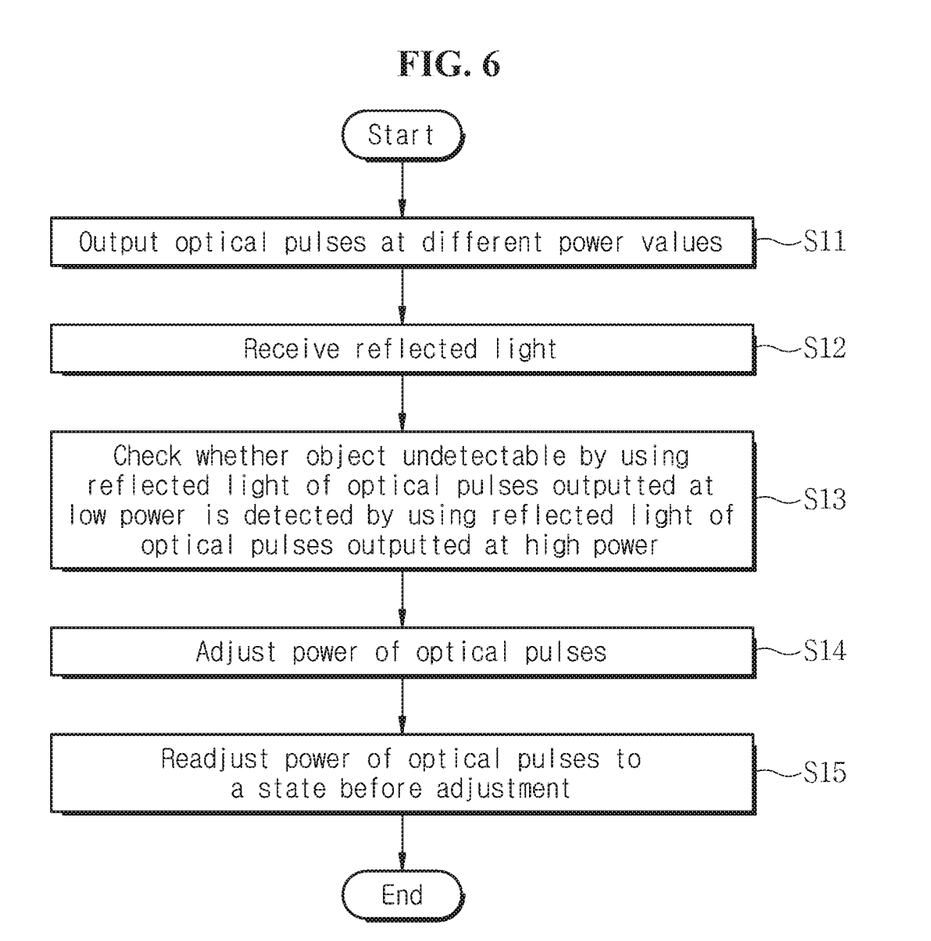
FIG. 6 is a diagram illustrating a process of a light transmitting and receiving method according to an embodiment of the present invention.

FIG. 6 is a diagram illustrating a process of a light transmitting and receiving method according to an embodiment of the present invention.

Referring to FIG. 6, at step S1, the light transmitting/receiving device periodically outputs an optical frame containing a plurality of optical pulses in which some of the optical pulses are different in a power value from the others.

At this time, the optical pulses outputted at relatively low power are used for a normal detecting operation, and the optical pulses outputted at relatively high power are used for detecting an object which is undetectable when using the low-power optical pulses.

Then, at step S12, the light transmitting/receiving device receives reflected light corresponding to the optical pulses outputted at step S11.

In addition, at step S13, the light transmitting/receiving device checks whether an object which is undetectable by using the reflected light of the optical pulse outputted at relatively low power at step S11 is detected by using the reflected light of the optical pulse outputted at relatively high power at step S11.

At step S13, the light transmitting/receiving device may recognize that there is a difference between detection data according to the optical pulse outputted at high power and detection data according to the optical pulse outputted at low power.

Then, at step S14, the light transmitting/receiving device adjusts the power of optical pulses to be outputted thereafter.

At step S14, the light transmitting/receiving device may perform a precise detecting operation by adjusting the power of the low-power optical pulse to be increased. In this case, the light transmitting/receiving device may adjust both the high-power optical pulse and the low-power optical pulse to be outputted at the same power value, thereby equally matching the output level of all the optical pulses.

In addition, when adjusting the power of the optical pulses at step S14, the light transmitting/receiving device may adjust the power to be discontinuously increased according to a predetermined value. For this, the light transmitting/receiving device may store a power adjustment value in an internal memory or the like.

Alternatively, when adjusting the power of the optical pulses at step S14, the light transmitting/receiving device may adjust the power to be continuously increased. In this case, at step S14, the light transmitting/receiving device may perform a continuous adjusting process in a manner of checking the detection data according to the optical pulses outputted at the adjusted power and then adjusting again the power of the optical pulses.

Meanwhile, in case where the light transmitting/receiving device outputs the optical frame at step S11 while varying the output direction of the optical pulses contained in the optical frame, the light transmitting/receiving device may adjust, at step S14, the power of the optical pulses to be outputted in a direction that causes a difference in detection data.

Through the above process, the light transmitting/receiving device may adjust the power of the optical pulses at step S14 and then check the detection data according to the optical pulses outputted at the adjusted power. As a result, if a precise detection is not accomplished due to a lack of data, etc., the light transmitting/receiving device may further adjust the power of optical pulses to be outputted thereafter so as to improve the detection accuracy.

After performing the precise detecting operation through the power adjustment of the optical pulses, the light transmitting/receiving device returns, at step S15, the power of optical pulses, to be outputted for object detection, to an original state such as step S11 which is before the adjustment, that is, in a normal detection state.

At this step, if a predetermined time has elapsed after the power adjustment of the optical pulse, the light transmitting/receiving device may readjust the power of the optical pulses to be outputted thereafter to an original state before the adjustment.

In addition, at step S15, the light transmitting/receiving device may output a specific optical pulse at the same power as that of the optical pulse outputted at low power before the adjustment at step S14, and recognize that there is no difference between detection data according to the reflected light of the power-adjusted optical pulse and detection data according to the specific optical pulse.

Then, the light transmitting/receiving device may readjust the power of the optical pulses to be outputted to an original state before the adjustment at step S14.

The light transmitting and receiving method according to embodiments of the disclosure may be implemented in the form of a program readable by various computing devices and also recorded in a non-transitory computer-readable recording medium.

While this disclosure has been particularly shown and described with reference to an exemplary embodiment thereof, it will be understood by those skilled in the art that various changes in form and details may be made therein without departing from the scope of the present invention as defined by the appended claims.

The invention claimed is:

1. A light transmitting and receiving device comprising:
a light source configured to output a plurality of optical pulses;
a light receiver configured to receive reflected light corresponding to the plurality of optical pulses;
a controller configured to control the light source to periodically output the plurality of optical pulses in successive frames, wherein a first optical pulse among the plurality of optical pulses is outputted at low power, and a second optical pulse among the plurality of optical pulses is outputted at high power which is greater than the low power of the first optical pulse; and
a detector configured to detect an object by using the reflected light received by the light receiver and to output detected data to the controller,
wherein when a first detected data based on the reflected light of the first optical pulse outputted at the low power is different from a second detected data based on the reflected light of the second optical pulse outputted at the high power, the controller is configured to control the light source to increase the low power of the first optical pulse.

2. The device of claim 1, wherein the increased low power of the first optical pulse is equal to the high power of the second optical pulse.

3. The device of claim 1, wherein the controller is further configured to control the light source to increase the low power of the first optical pulse to be outputted in a direction that causes the difference between the first detected data and the second detected data.

4. The device of claim 1, wherein the controller is further configured to control the light source to increase the low power of the first optical pulse either discontinuously based on a predetermined value or continuously to correspond to the detected data of the detector.

5. The device of claim 1, wherein the controller is further configured to readjust the power of the optical pulses to be outputted thereafter by the light source in response to the detected data corresponding to the first optical pulse outputted at the increased low power.

6. The device of claim 1, wherein the controller is further configured to, after an elapse of a predetermined time from increasing the low power of the first optical pulse readjust the power of the optical pulses to be outputted thereafter by the light source.

7. A light transmitting and receiving method, the method formed by a light transmitting and receiving device comprising a light source, a light receiver, a controller, and a detector, the method comprising:
periodically outputting, through the light source, a plurality of optical pulses in successive frames, wherein a first optical pulse among the plurality of optical pulses is outputted at low power, and a second optical pulse among the plurality of optical pulses is outputted at high power which is greater than the low power of the first optical pulse;

receiving, through the light receiver, reflected light corresponding to the outputted plurality of optical pulses; and detecting, through the detector, an object by using the reflected light and generating detected data, wherein when a first detected data based on the reflected light of the first optical pulse outputted at the low power is different from a second detected data based on the reflected light of the second optical pulse outputted at the high power, the controller controls the light source to increase the low power of the first optical pulse.

8. The method of claim 7, further comprising: in response to the detected data corresponding to the first optical pulse outputted at the increased low power, readjusting the power of the optical pulses to be outputted thereafter.

9. The method of claim 7, further comprising: at the light transmitting and receiving device, after an elapse of a predetermined time from increasing the low power of the first optical pulse, readjusting the power of the optical pulses to be outputted thereafter.

10. A non-transitory computer-readable recording medium storing a program to perform a light transmitting and receiving method, the method performed by a light transmitting and receiving device comprising a light source, a light receiver, a controller, and a detector, the method comprising:

periodically outputting, through the light source, a plurality of optical pulses in successive frames, wherein a first optical pulse among the plurality of optical pulses is outputted at low power, and a second optical pulse among the plurality of optical pulses is outputted at high power which is greater than the low power of the first optical pulse;

receiving, through the light receiver, reflected light corresponding to the plurality of outputted optical pulses; and detecting, through the detector, an object by using the reflected light and generating detected data, wherein when a first detected data based on the reflected light of the first optical pulse outputted at the low power is different from a second detected data based on the reflected light of the second optical pulse outputted at the high power, the controller controls the light source to increase the low power of the first optical pulse.

\* \* \* \* \*